(12) United States Patent
Balarajan et al.

(10) Patent No.: US 10,275,775 B2
(45) Date of Patent: Apr. 30, 2019

(54) CONTEXT GENERATION FOR ROUTING ON-DEMAND SERVICES

(71) Applicant: Microsoft Technology Licensing, LLC, Redmond, WA (US)

(72) Inventors: Paul Sanjeev Balarajan, Bellevue, WA (US); Matt J. Lopez, Seattle, WA (US); Warren Johnson, Sammamish, WA (US); Masroor Hussain Syed, Mill Creek, WA (US); Andy Kwan Jin Siow, Bellevue, WA (US); Brian VanDoren, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 14/965,537

(22) Filed: Dec. 10, 2015

(65) Prior Publication Data

US 2017/0169437 A1    Jun. 15, 2017

(51) Int. Cl.
 G06F 17/30    (2006.01)
 G06Q 10/06    (2012.01)
 G06Q 30/00    (2012.01)

(52) U.S. Cl.
 CPC ..... *G06Q 30/016* (2013.01); *G06F 17/30528* (2013.01); *G06Q 10/063112* (2013.01)

(58) Field of Classification Search
 CPC .......... G06Q 30/016; G06Q 10/063112; G06F 17/30528
 USPC .................. 379/265.12, 265.13, 266.01, 309
 See application file for complete search history.

(56) References Cited

U.S. PATENT DOCUMENTS

| | | | |
|---|---|---|---|
| 5,206,903 A | 4/1993 | Kohler et al. |
| 5,825,869 A | 10/1998 | Brooks et al. |
| 6,021,403 A | 2/2000 | Horvitz et al. |
| 6,131,122 A | 10/2000 | Sampson |
| 6,298,457 B1 | 10/2001 | Rachlin et al. |
| 6,453,038 B1 | 9/2002 | McFarlane et al. |
| 6,542,601 B1 | 4/2003 | Hernandez et al. |
| 6,704,409 B1 | 3/2004 | Dilip et al. |
| 6,742,141 B1 | 5/2004 | Miller |
| 7,769,161 B1 | 8/2010 | Hession et al. |
| 7,958,494 B2 | 6/2011 | Chaar et al. |
| 8,001,527 B1 | 8/2011 | Qureshi et al. |
| 8,555,113 B2 | 10/2013 | Fan et al. |
| 8,588,395 B2 | 11/2013 | Hendricks et al. |
| 8,589,323 B2 | 11/2013 | Keith, Jr. |
| 8,638,925 B1 | 1/2014 | Billman |
| 8,718,272 B2 | 5/2014 | Desai et al. |

(Continued)

FOREIGN PATENT DOCUMENTS

| | | |
|---|---|---|
| EP | 2763436 A1 | 8/2014 |
| WO | 2015006308 A1 | 1/2015 |

OTHER PUBLICATIONS

"Verint", Retrieved on: Jul. 28, 2015 Available at: http://www.verint.com/solutions/customer-engagement-optimization/voice-of-the-customer-analytics/products/text-analytics/.

(Continued)

*Primary Examiner* — Quynh H Nguyen
(74) *Attorney, Agent, or Firm* — Christopher J. Volkmann; Kelly, Holt & Christenson, PLLC

(57) ABSTRACT

Context information, indicative of a tenant's engagement with a multi-tenant service, is obtained. An engagement state for the tenant is determined and the context information, and engagement state, are correlated to an issue to be addressed. A user experience is conducted, based upon the likely issue to be addressed.

15 Claims, 18 Drawing Sheets

(56) References Cited

U.S. PATENT DOCUMENTS

| | | | |
|---|---|---|---|
| 8,737,598 | B2 | 5/2014 | Bruce et al. |
| 8,793,359 | B1 | 7/2014 | Fiebig et al. |
| 8,837,704 | B2 | 9/2014 | Ramanathan et al. |
| 8,837,711 | B2 | 9/2014 | Vasquez et al. |
| 8,874,636 | B2 | 10/2014 | Tuchman et al. |
| 8,949,939 | B2 | 2/2015 | Peddada |
| 8,965,957 | B2 | 2/2015 | Barros |
| 9,026,851 | B2 | 5/2015 | Mondal et al. |
| 9,654,639 | B1 | 5/2017 | Balarajan et al. |
| 9,686,406 | B1 | 6/2017 | Lopez et al. |
| 2004/0161097 | A1 | 8/2004 | Henry |
| 2005/0131943 | A1 | 6/2005 | Lewis et al. |
| 2006/0062374 | A1 | 3/2006 | Gupta |
| 2007/0100782 | A1 | 5/2007 | Reed et al. |
| 2007/0116185 | A1 | 5/2007 | Savoor et al. |
| 2007/0133755 | A1 | 6/2007 | Jean et al. |
| 2007/0168874 | A1 | 7/2007 | Kloeffer et al. |
| 2008/0263077 | A1 | 10/2008 | Boston |
| 2009/0076671 | A1 | 3/2009 | Heacock |
| 2009/0119147 | A1 | 5/2009 | Messer |
| 2009/0181665 | A1 | 7/2009 | Sater et al. |
| 2010/0257583 | A1 | 10/2010 | Ngo et al. |
| 2011/0225636 | A1 | 9/2011 | Keith et al. |
| 2012/0054731 | A1 | 3/2012 | Aravamudan et al. |
| 2012/0072229 | A1 | 3/2012 | Zaldivar et al. |
| 2012/0076283 | A1 | 3/2012 | Ajmera et al. |
| 2012/0101865 | A1 | 4/2012 | Zhakov |
| 2012/0309351 | A1 | 12/2012 | Dutta |
| 2013/0013475 | A1 | 1/2013 | Marakowitz et al. |
| 2013/0046571 | A1 | 2/2013 | Tuchman et al. |
| 2013/0090976 | A1 | 4/2013 | White et al. |
| 2013/0103749 | A1 | 4/2013 | Werth et al. |
| 2013/0103973 | A1 | 4/2013 | Werth et al. |
| 2013/0173479 | A1 | 7/2013 | Paz Salgado et al. |
| 2013/0198039 | A1 | 8/2013 | Sridharan et al. |
| 2013/0325726 | A1 | 12/2013 | Tuchman et al. |
| 2014/0006292 | A1 | 1/2014 | Kozlovsky et al. |
| 2014/0108073 | A1 | 4/2014 | Castel et al. |
| 2014/0119531 | A1 | 5/2014 | Tuchman |
| 2014/0162611 | A1 | 6/2014 | Mezhibovsky et al. |
| 2014/0171034 | A1 | 6/2014 | Aleksin et al. |
| 2014/0236934 | A1 | 8/2014 | Boyle et al. |
| 2014/0245141 | A1 | 8/2014 | Yeh et al. |
| 2014/0278646 | A1 | 9/2014 | Adrian et al. |
| 2014/0278785 | A1 | 9/2014 | Gaedcke et al. |
| 2014/0279718 | A1 | 9/2014 | Southey et al. |
| 2014/0297743 | A1 | 10/2014 | Zyto et al. |
| 2014/0324647 | A1 | 10/2014 | Iyoob et al. |
| 2014/0336795 | A1 | 11/2014 | Asenjo et al. |
| 2015/0026254 | A1 | 1/2015 | Keller et al. |
| 2015/0074785 | A1 | 3/2015 | Driscoll et al. |
| 2015/0100359 | A1 | 4/2015 | Brunet et al. |
| 2015/0135013 | A1 | 5/2015 | Thomas et al. |
| 2015/0147999 | A1 | 5/2015 | Venezia et al. |
| 2015/0195407 | A1 | 7/2015 | Kaufman |
| 2015/0281454 | A1 | 10/2015 | Milstein et al. |
| 2015/0370621 | A1 | 12/2015 | Karp et al. |
| 2016/0239352 | A1 | 8/2016 | Evans |
| 2016/0267551 | A1 | 9/2016 | Zheng et al. |
| 2016/0283889 | A1 | 9/2016 | Shukla et al. |
| 2017/0091778 | A1 | 3/2017 | Johnson et al. |
| 2017/0091779 | A1 | 3/2017 | Johnson et al. |
| 2017/0168877 | A1 | 6/2017 | Johnson et al. |
| 2017/0171389 | A1 | 6/2017 | Lopez et al. |
| 2017/0249643 | A1 | 8/2017 | Lopez et al. |

OTHER PUBLICATIONS

"Eptica enables businesses to increase revenue from customer service with new Multichannel Customer Interaction Suite", Published on: Apr. 9, 2013 Available at: http://www.eptica.com/eptica-enables-businesses-increase-revenue-customer-service-new-multichannel-customer-interaction.

"Interaction Analytics?", Retrieved on: Jul. 28, 2015 Available at: http://www.nice.com/engage/workforce-optimization/interaction-analytics.

"Avaya Aura Contact Center Software Review", Published on: Jan. 9, 2012 Available at: http://www.crmsearch.com/avaya-contact-center-capabilities.php.

"Contact center", Published on: Jul. 16, 2012 Available at: https://msdn.microsoft.com/en-us/library/office/dn465935.aspx.

"Onboarding API Guide—Java", Retrieved on: Feb. 17, 2016 Available at: https://allseenalliance.org/framework/documentation/develop/api-guide/onboarding/java.

"Oracle TBE Onboarding Cloud Service", Retrieved on: Feb. 17, 2016 Available at: http://www.oracle.com/us/media1/tbe-onboarding-cloud-service-1676869.pdf.

"Axway API Gateway", Published on: Apr. 21, 2015 Available at: https://www.axway.com/sites/default/files/datasheet_files/axway_datasheet_api-gateway_en.pdf.

"Microsoft FastTrack: getting your customers to the cloud", Retrieved on: Feb. 17, 2016 Available at: https://partner.microsoft.com/en-US/Solutions/fasttrack.

Danielson, Steve, "What is Azure API Management?", Published on: Sep. 21, 2015 Available at: https://azure.microsoft.com/en-in/documentation/articles/api-management-get-started/.

Application and Drawings for U.S. Appl. No. 15/099,724, filed Apr. 15, 2016, 76 pages.

Non-Final Office Action for U.S. Appl. No. 14/995,596 dated Sep. 15, 2016, 11 pages.

"International Preliminary Report on Patentability Issued in PCT Application No. PCT/US2016/063747", dated Mar. 20, 2018, 8 Pages.

"Microsoft FastTrack: getting your customers to the cloud", Retrieved on Jul. 31, 2015 Available at: https://mspartner.microsoft.com/en/us/pages/solutions/fasttrack.aspx#overview.

"TAG Solutions Managed Services Onboarding Process Outline", Retrieved on: Jul. 31, 2015 Available at: http://tagsolutions.com/managed-services/customer-onboarding-outline/.

"Mailbox Migration to Exchange Online", Published on: Jun. 20, 2015 Available at: https://technet.microsoft.com/en-us/library/jj863291(v=exchg.150).aspx.

U.S. Appl. No. 15/052,271, filed Feb. 24, 2016 Application and drawings. 65 pages.

U.S. Appl. No. 14/995,596, filed Jan. 14, 2016 Application and drawings. 64 pages.

"Inbound Automatic Call Distribution (ACD) Systems", Retrieved on: Jul. 27, 2015 Available at: http://www.aspect.com/in/solutions/customer-experience/inbound-automatic-call-distribution-acd-systems.

Cyriac, Francis, "Ameyo Callversations", Published on: Jan. 29, 2015 Available at: http://www.ameyo.com/blog/ameyo-call-center-integration-with-freshdesk.

Amendment for U.S. Appl. No. 14/995,596 dated Nov. 29, 2016, 13 pages.

Notice of Allowance for U.S. Appl. No. 14/995,596 dated Jan. 25, 2017, 10 pages.

Amendment After Notice of Allowance for U.S. Appl. No. 14/995,596 dated Feb. 7, 2017, 8 pages.

Notice of Allowance for U.S. Appl. No. 15/052,271 dated Feb. 14, 2017, 9 pages.

International Search Report and Written Opinion for International Patent Application No. PCT/US2016/063747, dated Feb. 7, 2017, date of filing: Nov. 25, 2016, 12 pages.

International Search Report and Written Opinion for International Patent Application No. PCT/US2016/063735, dated Feb. 7, 2017, date of filing: Nov. 25, 2016, 11 pages.

International Search Report and Written Opinion for International Patent Application No. PCT/US2016/063748, dated Feb. 7, 2017, date of filing: Nov. 25, 2016, 12 pages.

"Second Written Opinion Issued in PCT Application No. PCT/US2016/063747", dated Nov. 6, 2017, 7 Pages.

"Notice of Allowance Issued in U.S. Appl. No. 15/099,724", dated Oct. 19, 2018, 11 Pages.

"Final Office Action Issued in U.S. Appl. No. 15/593,642", dated Sep. 14, 2018, 10 Pages.

(56) References Cited

OTHER PUBLICATIONS

"Chatstack", Retrieved From: https://www.chatstack.com/android, Jul. 24, 2015, 4 Pages.
"Concierge & Lifestyle Management", Retrieved From: https://web.archive.org/web/20160331121136/https://rideau.com/programs/Concierge, Jun. 29, 2013, 1 Page.
"Customer Concierge", Retrieved From: http://circles.com/offer/customer-concierge/, Oct. 13, 2014, 2 Pages.
"Desk", Retrieved From: https://web.archive.org/web/20150715102931/http://www.desk.com/product, Dec. 30, 2014, 5 Pages.
"Don't ship your app without HelpStack", Retrieved From: http://www.helpstack.io/, May 16, 2014, 6 Pages.
"Happyfox", Retrieved From: https://www.happyfox.com/, Jan. 2014, 7 Pages.
"Improving IT Help Desk Services with Vendor Support", Retrieved From: https://searchdatacenter.techtarget.com/tip/Improving-IT-help-desk-services-with-vendor-support, Feb. 2011, 4 Pages.
"Kayako", Retrieved From: https://web.archive.org/web/20140730001822/https://www.kayako.com/product/tour, Jul. 4, 2014, 9 Pages.
"In-app Customer Support for Mobile Apps", Retrieved From: https://web.archive.org/web/20150226182022/http://freshdesk.com/mobihelp, Feb. 13, 2015, 6 Pages.
"Make It Easy to Engage Users With In-App Feedback & Support", Retrieved From: https://web.archive.org/web/20150106160919/https://www.helpshift.com/, Jan. 6, 2015, 3 Pages.
"Nexsan Increases Customer and Partner Service Levels with New Facilities and Enhanced Support Infrastructure", Retrieved From: http://www.reuters.com/article/2012/05/03/idUS155110+03-May-2012+MW20120503, May 3, 2012, 3 Pages.
"Salesforce Partner Program Guide for Consulting Partners", Retrieved From: https://www.google.co.in/url?sa=t&rct=j&q=&esrc=s&source=web&cd=7&cad=rja&uact=8&ved=OCD8QFjAGahUKEwi9ktLF2P3GAhVJBY4KHdFTCEU&url=https%3A%2F%2Fpartners.salesforce.com%2Fs%2FFY15CioudAlliancePartnerProgramGuide1.pdf%3Fv/%3D2&ei=am03Vb21 EcmKuA TRp6GoBA&usg=AFQjCNFcNAqaCnaDws41fKEjbUYM5Waw9g&sig2=BY66hSmP8N-, Feb. 2015, 24 Pages.
"SmarterTools", Retrieved From: https://www.smartertools.com/smartertrack/online-help-desk, Mar. 15, 2015, 2 Pages.
"Support Swarming Boosts Productivity, Satisfaction & Retention", In BOMGAR Whitepaper, May 15, 2013, 4 Pages.
"Zendesk", Retrieved From: https://www.zendesk.com/product/mobile/, 3 Pages, Dec. 10, 2015.
"Non Final Office Action Issued in U.S. Appl. No. 14/870,636", dated May 3, 2018, 40 Pages.
"Non Final Office Action Issued in U.S. Appl. No. 14/870,795", dated Jun. 29, 2018, 36 Pages.
"Final Office Action Issued in U.S. Appl. No. 15/099,724", dated Jul. 11, 2018, 52 Pages.
"Non Final Office Action Issued in U.S. Appl. No. 15/099,724", dated Jan. 12, 2018, 48 Pages.
"Non Final Office Action Issued in U.S. Appl. No. 15/593,642", dated Apr. 19, 2018, 12 Pages.
Antequino, J J., "Have You Used Your Microsoft Virtual Partner Concierge?", Retrieved From: https://blogs.technet.microsoft.com/uspartner_ts2team/2011/04/20/have-you-used-your-microsoft-virtual-partner-concierge/, Apr. 20, 2011, 1 Page.
Mills, et al., "The Golden Keys" Being Served: Concierge Services and Customer Satisfaction, In Journal of International Business & Cultural Studies, vol. 1, Feb. 2009, 12 Pages.
Molen, Brad, "Samsung Launches Customer Service App on Android as Proof that it Cares", Retrieved From: https://www.engadget.com/2012/05/17/samsung-customer-service-app-android/, May 17, 2012, 3 Pages.
"International Preliminary Report on Patentability Issued in PCT Application No. PCT/US2016/053636", dated Nov. 27, 2017, 9 Pages.
"International Search Report & Written Opinion Issued in PCT Application No. PCT/US2016/053636", dated Nov. 10, 2016, 14 Pages.
"Second Written opinion Issued in PCT Application No. PCT/US2016/053636", dated Aug. 10, 2017, 9 Pages.
"International Preliminary Report on Patentability Issued in PCT Application No. PCT/US2016/063735", dated Mar. 20, 2018, 7 Pages.
"Second Written Opinion Issued in PCT Application No. PCT/US2016/063735", dated Nov. 6, 2017, 6 Pages.
"International Preliminary Report on Patentability Issued in PCT Application No. PCT/US2016/063748", dated Mar. 20, 2018, 7 Pages.
"Second Written Opinion Issued in PCT Application No. PCT/US2016/063748", dated Nov. 6, 2017, 7 Pages.
"International Preliminary Report on Patentability Issued in PCT Application No. PCT/US2017/012659", dated Mar. 23, 2018, 8 Pages.
"International Search Report and Written Opinion Issued in PCT Application No. PCT/US2017/012659", dated Feb. 23, 2017, 12 Pages.
"Second Written Opinion Issued in PCT Application No. PCT/US2017/012659", dated Dec. 6, 2017, 7 Pages.
"Final Office Action Issued in U.S. Appl. No. 14/870,636", dated Nov. 29, 2018, 47 Pages.
"Final Office Action Issued in U.S. Appl. No. 14/870,795", dated Jan. 28, 2019, 14 Pages.

Onboarding Assets agent not available

We're here to help | Need Help?

Hey Robert,
Welcome! We're delighted you signed up for ACME services. If you need help at any time, click on the orange "Need Help?" box at the bottom right of most pages.

Let us help you get going

Please drop us an email and we'll get back to you (usually within 12 hours). We want to help you get started using ACME services.

Add a little detail for us to review. We're here to help!

What's your email address?
Maggie@Hotmail.com

Send

CONTEXT GENERATION FOR ROUTING ON-DEMAND SERVICES

BACKGROUND

Computer systems are currently in wide use. Some computer systems host multi-tenant systems for organizations. Each tenant corresponds to a different organization, and each organization may have a number of different users, each of whom use a client device.

Such multi-tenant systems often allow tenants, or even individual users, to add services that are hosted by the multi-tenant computing system. However, it can be difficult for a tenant to add a service. The process by which a service is added, or by which a tenant registers for a service, can be cumbersome and technically complicated. In addition, even after a service is successfully added, some tenants find it difficult to have their users engage with a new service, and actually use it.

In order to address these types of problems, some companies provide technical support services. To take advantage of such services, a user often needs to call, by telephone, or to contact the technical support personnel using some type of electronic messaging. When a technical support request is received, it is often routed to an individual technician who may be able to help with the problem. However, the problems are often not correctly identified, at the beginning. Therefore, the user who is requesting technical support may be routed to one department or individual technician, who is not suited to address the problem. Therefore, the user is re-routed to another department, and this process can be repeated. This can lead to a high level of dissatisfaction among users of the multi-tenant services.

The discussion above is merely provided for general background information and is not intended to be used as an aid in determining the scope of the claimed subject matter.

SUMMARY

Context information, indicative of a tenant's engagement with a multi-tenant service, is obtained. An engagement state for the tenant is determined and the context information, and engagement state, are correlated to an issue to be addressed. A user experience is conducted, based upon the likely issue to be addressed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5A and 5B show examples of user interface displays.

FIGS. 6A-6C show examples of user interface displays.

DETAILED DESCRIPTION

Figure 1:
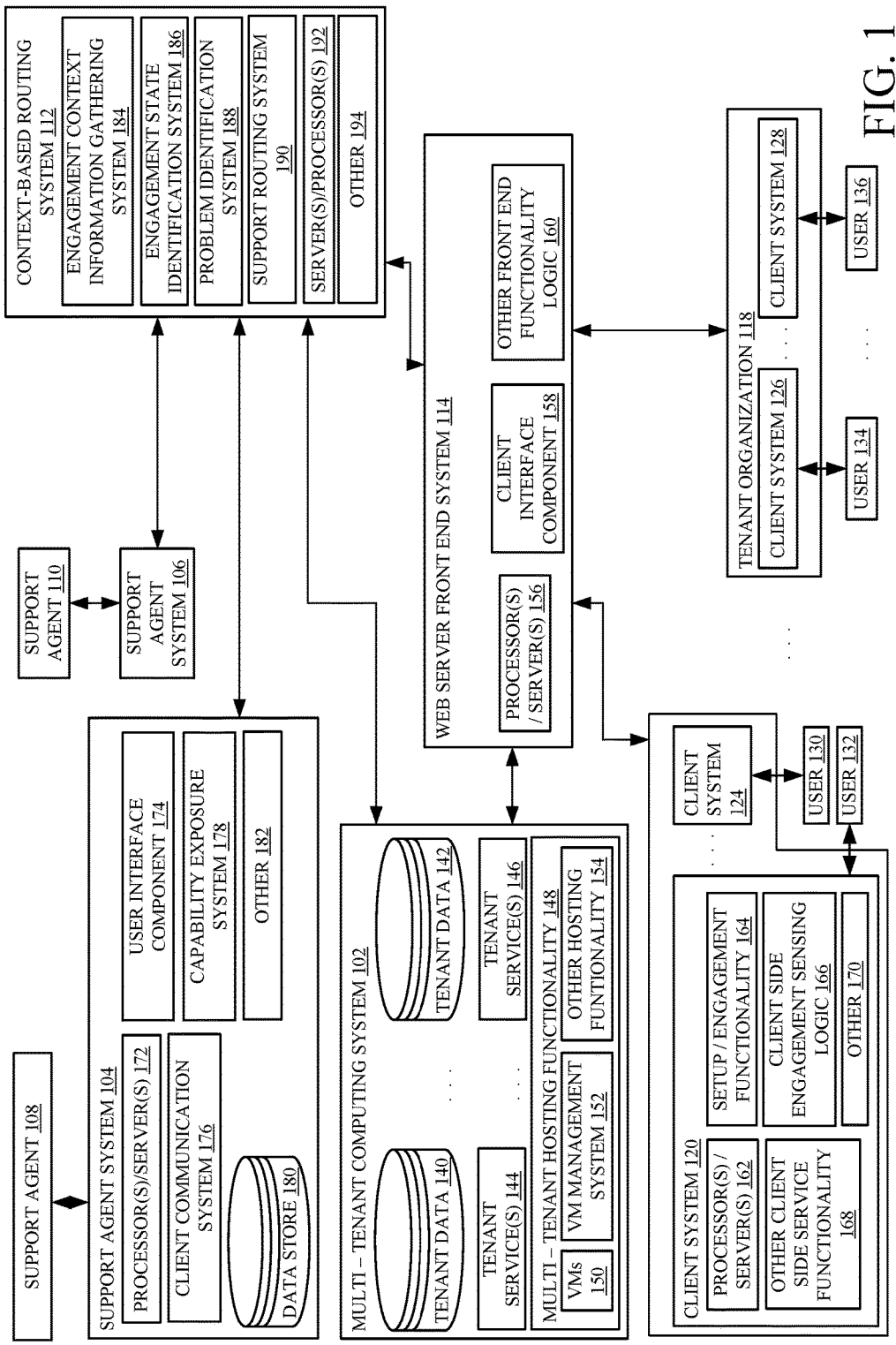
FIG. 1 is a block diagram of one example a multi-tenant computing system architecture.

FIG. 1 is a block diagram of one example of a multi-tenant computing system architecture 100. Architecture 100 illustratively includes multi-tenant computing system 102, one or more support agent systems 104-106, each of which can be used by one or more support agents 108-110. Architecture 100 also illustratively includes context-based routing system 112, web server front end system 114, and one or more tenant organizations 116-118 that interact with multi-tenant computing system 102 through web server front end system 114.

Each tenant organization 116-118 can include a plurality of client systems 120-128, and can be used by a plurality of users 130-136. Each tenant organization may be a separate organization that accesses multi-tenant computing system 102 for hosted services, data, applications, etc. Users 130-136 each illustratively interact with one or more client systems 120-128 in order to control and manipulate not only the corresponding client systems, but multi-tenant computing system 102, as well.

Each of the client systems 120-128 can include one or more servers or processors 162, setup/engagement functionality 164, engagement sensing logic 166, a wide variety of other client side service functionality 168, and it can include other items 170. Multi-tenant computing system 102 illustratively includes one or more sets of tenant data 140-142, and one or more sets of tenant services 144-146. It also illustratively includes multi-tenant hosting functionality 148 which, itself, can include one or more virtual machines 150, virtual machine management system 152, and a wide variety of other multi-tenant hosting functionality 154. Web server front end system 114 illustratively includes one or more servers or processors 156, client interface component 158, and it can include a wide variety of other front end functionality logic 160.

Support agents 108-110 illustratively interact with support agent systems 104-106 in order to provide support to users 130-136 (or tenants 116-118) when needed. Each support agent system 104 can include one or more processors or servers 172, user interface component 174, client communication system 176, capability exposure system 178, data store 180, and it can include a wide variety of other items 182.

Users 130-136 illustratively interact with setup and engagement functionality 164 in order to subscribe to (or setup) a client configuration to use multi-tenant services 144-146 or data. Engagement sensing logic 166 illustratively senses various metrics, values, inputs, and/or other information that is indicative of the state of readiness (e.g., the state of the setup of a tenant) as well as the state of engagement (e.g., the state of how many users are using the multi-tenant services, and at what level of usage) and provides that information through web server front end system 114 to context-based routing system 112. Users 130-136 also illustratively use other client side service functionality 168 in order to engage with, and use, the multi-tenant services hosted by system 162.

Client interface component 158 in web server front end system 114 illustratively generates client interface data that can be used by the various client systems. The client interfaces can include user input mechanisms that can be actuated by users 130-136 in order to control and manipulate multi-tenant computing system 102.

Virtual machine management system 152 illustratively manages the creation, operation, and deletion, of various virtual machines 150. Multi-tenant hosting functionality 148 also illustratively provides the functionality that is used in order to host the multi-tenant services or data that is accessed by the various tenant organizations 116-118.

Tenant services 144-146 can be any of a wide variety of multi-tenant services that are hosted by system 102. The tenant data 140-142 illustratively corresponds to the individual tenants or tenant organizations 116-118. Therefore, the tenant services 144-146 can operate on the tenant data 140-142, and can provide other services as well.

It may be that, at some point, one of the users 130-136 (or one of the tenants or tenant organizations 116-118) encounters issues or problems in configuring a tenant service that the tenant has just subscribed to, or in engaging with that service, and using it. In that case, support agents 108-110 may interact with users 130-136 in order to address the issues. In doing so, context-based routing system 112 illustratively identifies context information for the tenant organization (and user) that is having the issue, and identifies a state of readiness and engagement of that tenant (or user, or both) with respect to the service. It then identifies a support agent 108-110, based upon exposed capabilities that are exposed by agents 108-110 through capability exposure system 178. The client communication system in the corresponding support agent system is then used to communicate with a user of the given tenant, in order to address the issue.

As briefly mentioned above, context-based routing system 112 illustratively identifies context information regarding a tenant or tenant service, or even an individual user, that is having an issue. It then identifies a particular support agent that can provide support to that user or tenant based on the contact information. Context-based routing system 112 thus includes engagement context information gathering system 184, engagement state identification system 186, problem identification system 188, support routing system 190, one or more processors or servers 192, and it can include a wide variety of other items 194.

Engagement context information gathering system 184 illustratively gathers not only server side context information indicative of the readiness and engagement of a given tenant, but it can also communicate with engagement sensing logic 166 in order to gather client side readiness and engagement information. Based on that information, engagement state identification system 186 identifies a readiness state and an engagement state of the particular tenant for which the information was gathered.

Problem identification system 188 identifies problems in configuring a service, or in running a service, based upon the context information and based upon the engagement state. Support routing system 190 then routes the user (or tenant) having the issue to a given support agent 108-110. In doing so, it accesses capabilities exposed by the support agents 108-110 through capability exposure system 178. It matches the issue against the capabilities of the support agent, and then routes communication from the user (or tenant) with the issue to the identified support agent so that the user can obtain support from a qualified support agent.

Figure 2:
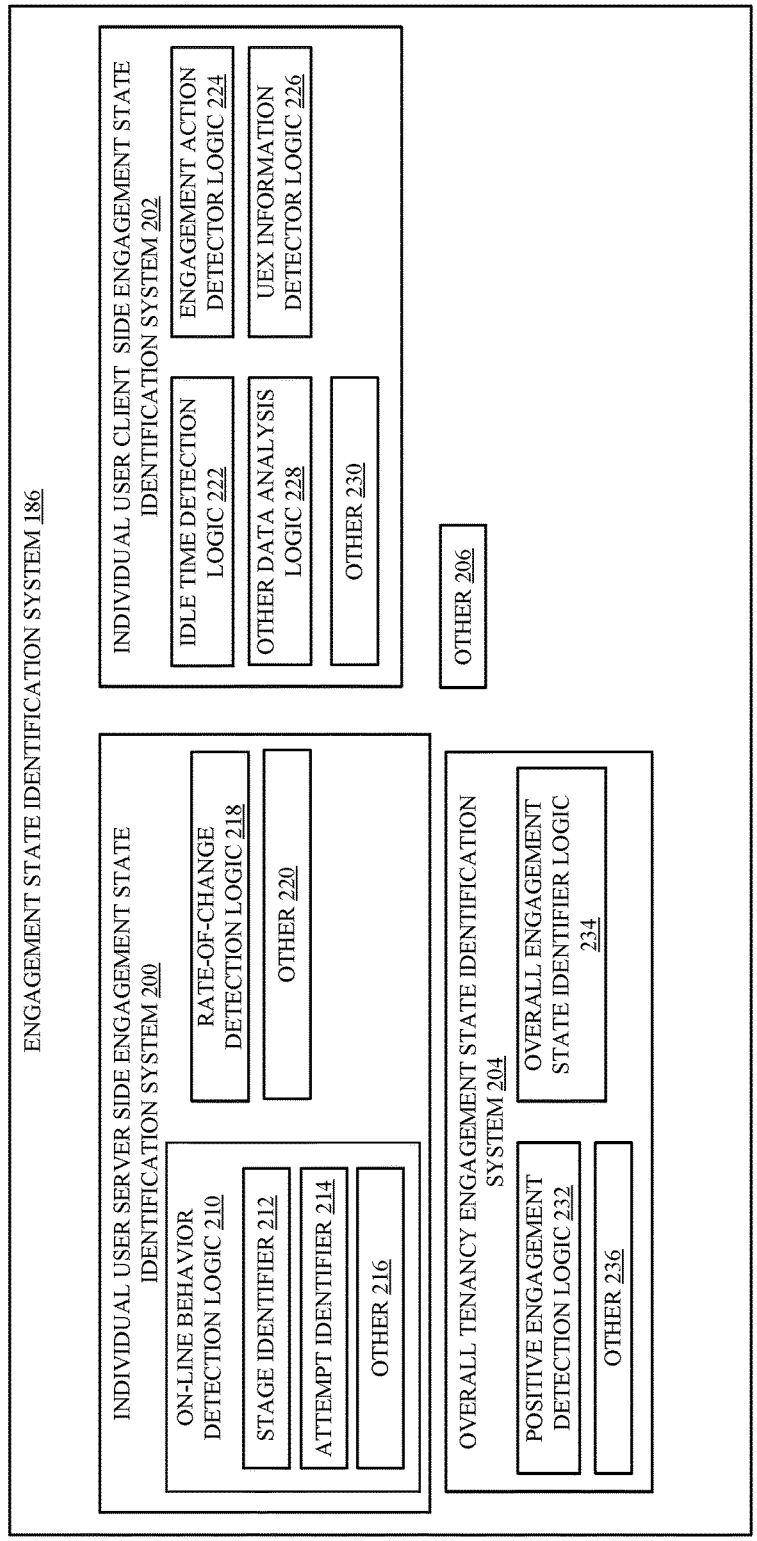
FIG. 2 is a more detailed block diagram of one example of an engagement state identification system.

Before describing the overall operation of architecture 100 in more detail, a brief description of some of the items shown in FIG. 1, and their corresponding operation, will first be provided. FIG. 2 shows a more detailed example of an engagement state identification system 186. System 186 illustratively includes an individual user, server side engagement state identification system 200, an individual user, client side engagement state identification system 202, and an overall tenancy engagement state identification system 204. It can include a wide variety of other items 206 as well.

The individual user, server side engagement state identification system 200 illustratively includes on-line behavior detection logic 210 which, itself, illustratively includes stage identifier logic 212, attempt identifier logic 214, and it can include a wide variety of other items 216. System 200 also illustratively includes rate-of-change detection logic 218 and it can include other items 220. Individual user, client side engagement state identification system 202 illustratively includes idle time detection logic 222, engagement action detector logic 224, user experience (UEX) information detector logic 226, other data analysis logic 228, and it can include other items 230. Overall tenancy engagement state identification system 204 illustratively includes positive engagement detection logic 232, overall engagement state identifier logic 234, and it can include other items 236.

Individual user, server side engagement state identification system 200 illustratively senses or detects various information indicative of server side activity of one or more individual users of a tenant. It then identifies a state of engagement and/or readiness of that individual user (or of that set of individual users). On-line behavior detection logic 210 detects the on-line behavior of the user. For instance, it may be that a user needs to perform a variety of different steps or tasks, in order to have an on-line service fully setup and configured for use. By way of example, it may be that a tenant needs to go through a set of setup or configuration stages, such as setup domain name information, install client components, connect the on-line service to the client components, and perform some type of data migration (such as migrating contacts, etc.). Each of these four stages may include a plurality of different steps or tasks. Attempt identifier 214 illustratively identifies attempts by a user to perform the steps or tasks for each of the stages. It also illustratively identifies when a stage has been completed. Stage identifier 212 illustratively identifies the last stage that was completed by the user in attempting to setup the on-line service. Rate-of-change detection logic 218 detects how quickly the tenant is moving through the various stages to become fully setup. By way of example, if the user performs all of the steps for the first stage in setting up domain name information, but then takes an inordinately long amount of time to perform tasks in the second stage (installing client components), stage identifier 212 will identify that the tenant has completed the first stage, but not the second stage. Attempt identifier 214 detects how many attempts the user has made to complete the second stage, and rate-of-change logic 218 will detect that the user appears to be stuck on the second stage, because the last stage completed by the user has not changed in an unusually long time.

Individual user client side engagement stage identification system 202 illustratively performs the same types of analysis, except with respect to the user's activity on the client side, instead of on the server side. By way of example, the engagement sensing logic 166 on the client side (shown in FIG. 1) may provide information that can be operated on or analyzed by system 202 to help identify the current state of readiness or engagement of the tenant. By way of example, assume that a setup wizard is provided to guide the user through the various stages needed to setup the on-line service. Idle time detection logic 222 may detect how long it has been since the user attempted to setup (or complete setting up) the on-line service. UEX information detector logic 226 may illustratively detect whether the user has launched the setup wizard, whether the user has launched it multiple times, without finishing the setup, etc. All of this and other information can be used to identify the stage of the engagement or readiness of the individual user, based upon the client side activity of that user.

Similarly, engagement action detector logic 224 illustratively detects engagement actions that are performed by the user. For instance, if the user is setting up an electronic mail (e-mail) service, and the user has attempted to send an e-mail, or receive and read an e-mail, etc., these actions can be detected by logic 224. All of this information can also be used, along with the information sensed by system 200, to identify an engagement stage of the tenant, and of individual users of the tenant.

Overall tenancy engagement state identification system 204 can use the information from systems 200 and 202, and other information, to determine an overall engagement state of a particular tenant. For instance, if no users at the tenant have ever used the service, then the engagement state may be "unengaged". If a single user has used the service, then the engagement state may be set to a first level, indicating that the tenant has successfully setup with the service, and at least one person has successfully used it. Other thresholds can be set for different percentages of the overall users at the tenant that are using the service. When the number of users using the service reaches those different thresholds, then the engagement state of the tenant can be increased to reflect that more individual users at the tenant are actually and positively engaged with the service.

In order to do so, positive engagement detection logic 232 can detect a number of individual users at a tenant (if any) that have had a positive engagement with the service. By positive engagement it is meant that the user has successfully used some aspect of the service. By way of example, if the service is an e-mail service, a positive engagement would be that a user has successfully sent or received an e-mail. Overall engagement state identifier logic 234 identifies the overall engagement state of the tenant, based upon the users who have had a positive engagement with the service.

It can set the overall engagement state of the tenant by comparing the number of users (or percent of the users or other measure of the users) of a tenant that have had a positive engagement against threshold values. It can also set the engagement state based upon the complexity of the engagement operations that have been performed by a user. By way of the above example, where the service is an e-mail service, if a user has sent an e-mail, that may correspond to a first engagement state. However, if the user has created multiple folders in the e-mail system, or successfully attached an attachment to an e-mail, or performed other actions, those actions are more complex, and may thus correspond to one or more different engagement states. All of these and other options are contemplated herein.

Figure 3:
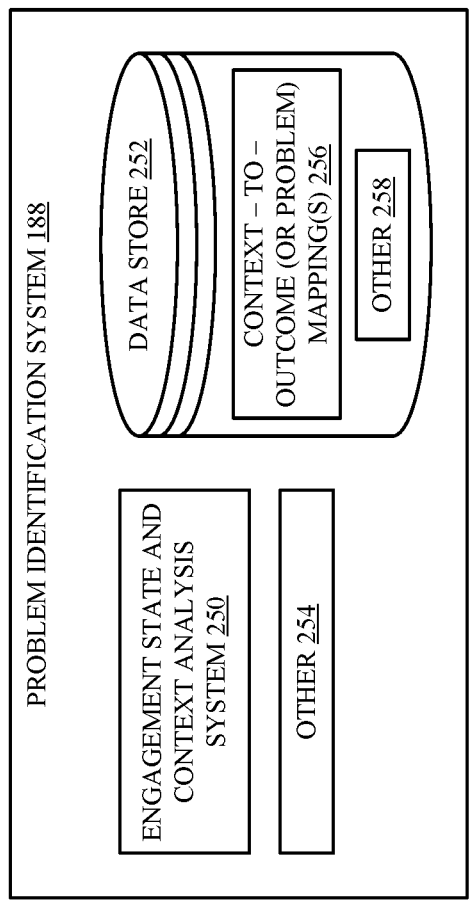
FIG. 3 is a more detailed block diagram of one example of a problem identification system.

FIG. 3 is a block diagram showing one example of problem identification system 188 (shown in FIG. 1) in more detail. In one example, problem identification system 188 includes engagement state and context analysis system 250, data store 252, and it can include a wide variety of other items 254. Data store 252 illustratively includes context-to-outcome (or problem) mappings 256. Mappings 256 illustratively map the context information of a particular tenant to a likely problem that the tenant is having or a likely outcome as to whether the tenant will successfully setup and engage with a service. In one example, mappings 256 are generated based on historical information collected from a plurality of other tenants, and users.

Engagement state and context analysis system 250 illustratively receives the various context information gathered by engagement context information gathering system 184 and also receives the various engagement state information identified by engagement state identification system 186 and generates a set of overall context information. It then accesses data store 252 and correlates that overall context information to a likely outcome for the corresponding tenant, or to a likely problem that the corresponding tenant is having. System 188 can then output this information to support routing system 190 (shown in FIG. 1) that can route a user of the corresponding tenant to a particular support agent 108-110 based upon the capabilities exposed by support agents 108-110.

Therefore, in one example, support routing system 190 can route the tenant to a support agent that is capable of addressing the issues or problems encountered by that tenant, quickly and without transferring the tenant to a different support agent. This is because the support agent will be pre-qualified to handle the particular issued encountered by the tenant, based upon the capabilities that they have exposed through capability exposure system 178. System 112, having identified the likely issues or problems being encountered by the tenant, can then identify a support agent that is suitable to address those issues or problems.

Figure 4:
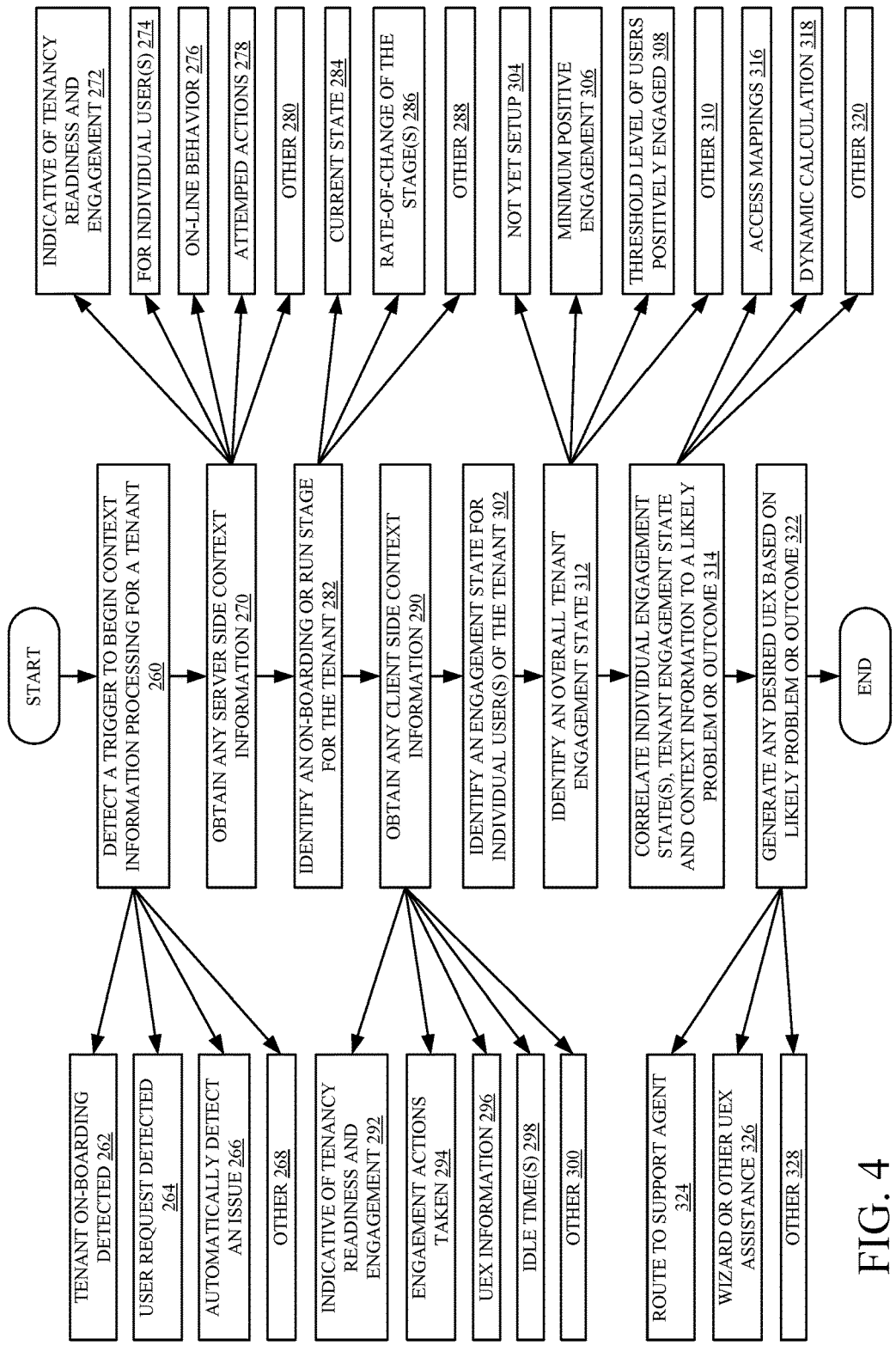
FIG. 4 is a flow diagram illustrating one example of the operation of the architecture shown in FIG. 1, in identifying an engagement state of a tenant in a multi-tenant architecture.

FIG. 4 is a flow diagram illustrating one example of the operation of the architecture shown in FIG. 1, in identifying context information and an engagement state of a tenant, correlating that to a likely problem or outcome for the tenant, and then performing any user experience (UEX) operations based upon the estimated outcome or problems. Context-based routing system 112 first detects a trigger indicating that it should begin context information processing for a tenant. This is indicated by block 260 in FIG. 4. There are a wide variety of different types of triggers that can be used to begin this processing. For instance, it may be that system 112 detects that a tenant has purchased a subscription for an on-line service and is attempting to configure this service for use. This is indicated by block 262. It may be that a user at a tenant is requesting help or assistance in addressing an issue. This is indicated by block 264. It may be that system 112 automatically detects that a user or tenant is encountering an issue or problem in either setting up a service or in using it. This is indicated by block 266. The triggers can be a wide variety of other triggers as well, and this is indicated by block 268.

Once it has been triggered, engagement context information gathering system 184 (or system 200 shown in FIG. 2) obtains any server side context information that may exist for the tenant. This is indicated by block 270. For instance, it may be context information, as discussed above, that is indicative of the tenancy readiness and engagement with a service that the tenant is attempting to setup and use. This is indicated by block 272. It may be context information for one or more individual users of a tenant, as indicated by block 274. It may be information indicative of on-line behavior of the users or of the tenant as a whole, as indicated by block 276. The context information may identify attempted actions, that one or more users of the tenant has attempted to perform in order to setup or positively engage with the service. This is indicated by block 278. It may include a wide variety of other server side context information as well, and this is indicated by block 280.

System 184 then identifies an onboarding or run stage for the tenant. This is indicated by block 282. For instance, this can include a current state of the tenant as indicated by block 284. It can also include a rate-of-change of the states that the tenant is going through. This is indicated by block 286. It can also include a wide variety of other information, as indicated by block 288.

System 184 (or system 202 shown in FIG. 2) then obtains any client side context information. This is indicated by block 290. This can be information indicative of the tenancy readiness and engagement with the service, as indicated by block 292. It can include an identification of any engagement actions that have been taken as indicated by block 294. It can include user experience (UEX) information 296, such as information indicating whether the user has successfully advanced through a setup wizard or other user experiences that may give an indication of readiness or engagement. The context information can include idle times 298 that indicate how long a user has been on a page of a multi-step wizard, how long the user has been at a certain stage in the setup process, etc. The client side context information can include a wide variety of other information 300 as well.

Engagement state identification system 186 then identifies an engagement state for one or more individual users of the tenant, based on the context information. This is indicated by block 302. The state may indicate that the service is not setup yet, as indicated by block 304. It may be a state of minimum positive engagement, such as when a single user or small group of users at the tenant has successfully used the service. This is indicated by block 306. It may be a higher state of engagement where the positive engagements by the users of the tenant exceed various different thresholds. This is indicated by block 308. The state of engagement of the individual users can be identified in other ways as well, and this is indicated by block 310.

Based upon the context information and engagement states of individual users of the tenant, overall tenancy engagement state identification system 204 then identifies an overall tenant engagement state for the tenant. Of course, this can be done based on other context information as well. This is indicated by block 312.

Engagement state and context analysis system 250 (in problem identification system 188 in FIG. 3) the correlates the individual user engagement states, the overall tenant engagement state, and the other context information, to a likely problem that is being encountered by the tenant. This is indicated by block 314. In doing so, system 250 can access the context-to-outcome (or problem) mappings 256. This is indicated by block 316. The correlation can also be based upon a dynamic calculation, instead of predefined mappings. This is indicated by block 318. The correlation can be performed in other ways as well, and this is indicated by block 320.

Once the engagement state is known, and once any issues or problems are identified, system 112 can perform any desired processing actions, or conduct any desired user experience (UEX). This is indicated by block 322. For instance, support routing system 190 can route the tenant communication to a support agent 108-110. This is indicated by block 324. System 112 can also surface a wizard or other UEX for a user of the tenant that can guide the user to address any identified issues or problems. This is indicated by block 326. A wide variety of other processing can be performed as well, based upon the state of engagement and any likely problems or outcomes, once they have been identified. This is indicated by block 328.

Figure 5A:
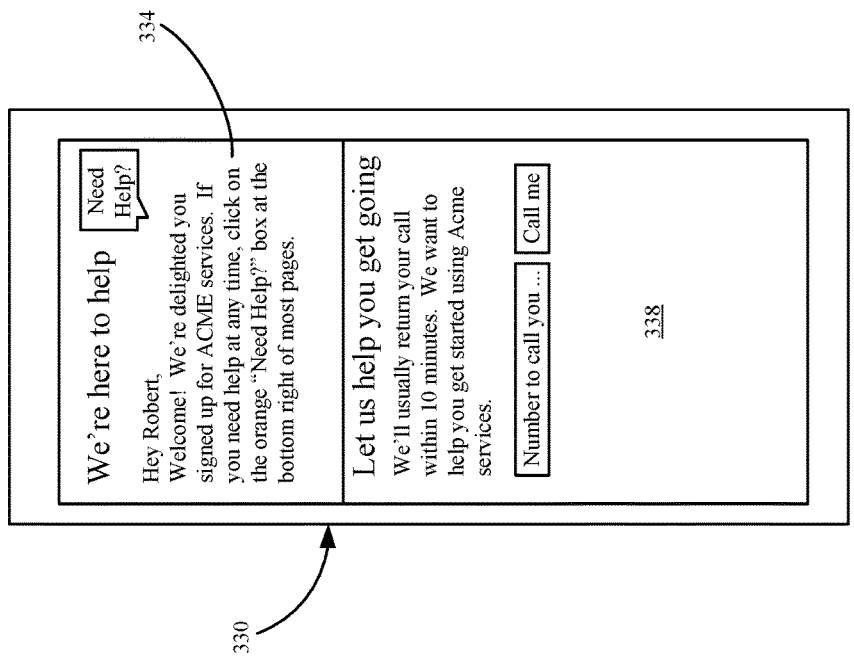

FIGS. 5A and 5B show two examples of user interface displays 330 and 332, respectively, that can be generated by context-based routing system 112 in response to being triggered. FIGS. 5A and 5B are illustratively generated during the onboarding processes when a tenant is attempting to setup or otherwise configure a service. The user interface display 330 may be generated when a support agent is available, and user interface display 332 may be generated when a support agent is not currently available. It can be seen that both displays include a greeting portion 334-336. Also, they each include a communication portion 338, 340. The communication portions 338-340 allow the user to enter a telephone number (where an agent is available) or other contact information (where an agent is unavailable). Portion 340 also allows a user to enter descriptive material describing the nature of the problem.

Figure 6A:
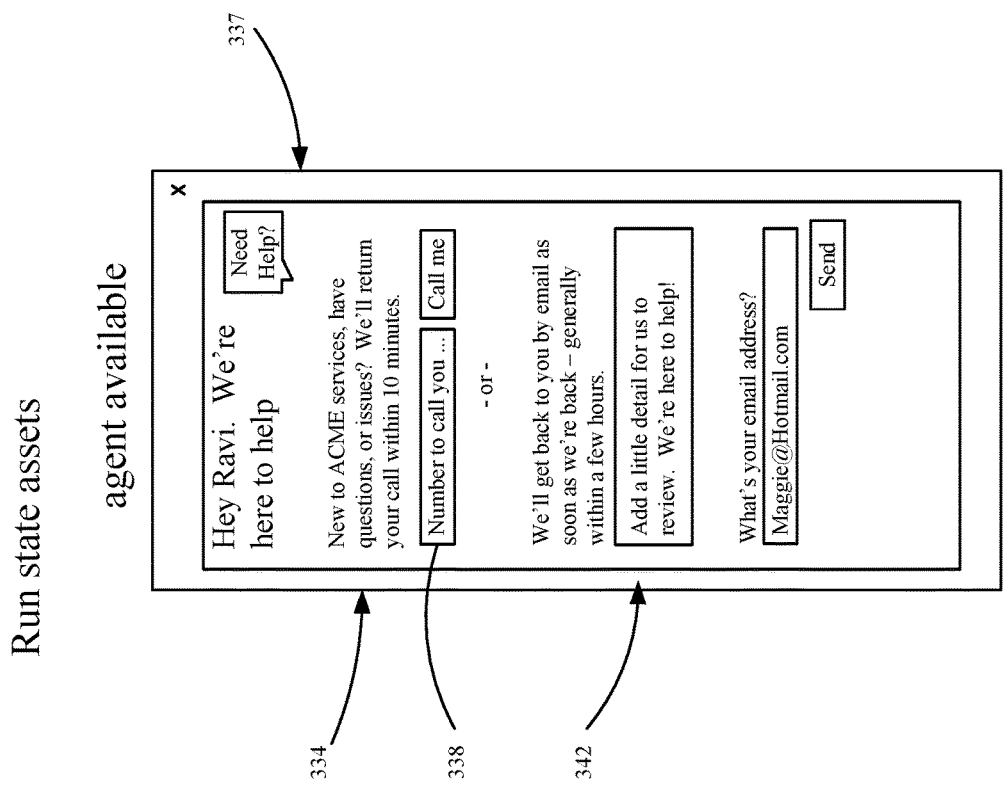
Figure 6B:
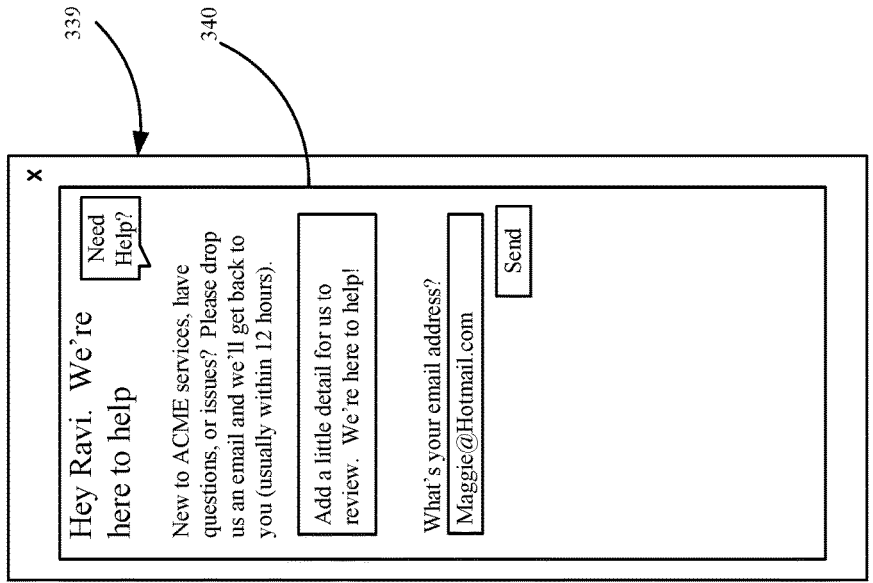

FIGS. 6A and 6B are similar to FIGS. 5A and 5B, and similar items are similarly numbered. FIGS. 6A and 6B may be generated when the tenant is already running the service, but is having a problem or issue with the service. Both FIGS. 6A and 6B include an introductory or salutation portion, 334 and 336, similar to those shown in FIGS. 5A and 5B. FIG. 6A shows one example of a user interface display 337 that may be generated where a user is available. Where an agent is available, the user can enter a telephone number in a text box to receive a call. This is illustrated generally at 338. Alternatively, the user can add detail and a contact address (such as an e-mail address) as indicated generally at block 342. FIG. 6B shows one example of a user interface display 339 that may be generated when an agent is not available. The user can describe the problem and enter contact information, as shown generally at 340.

Figure 6C:
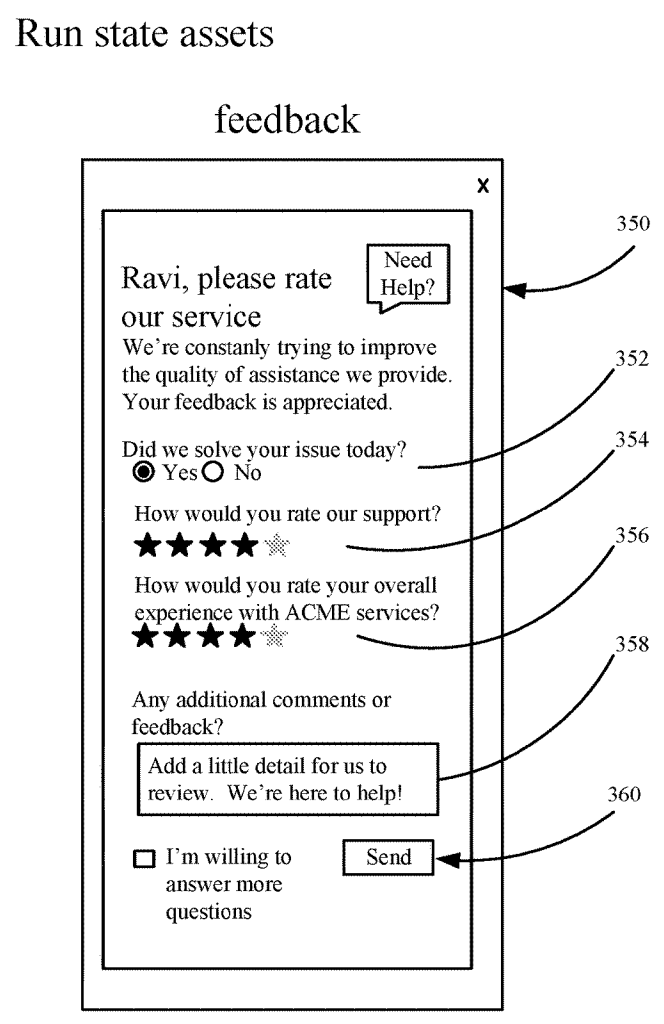

FIG. 6C shows an example of another user interface display 350. Display 350 can be generated to provide feedback, after a support agent has helped the user address the problem or issue that the user was dealing with. The display can provide a user input mechanism 352 that allows the user to indicate whether the issue was resolved. A user input mechanism 354 can be provided to allow the user to rate his or her support, and a user input mechanism 356 can be provided to allow the user to rate his or her overall experience. A comments user input mechanism 358 can be provided, as can a set of controls 360, that allow the user to submit the feedback or to answer further questions.

Figure 7A:
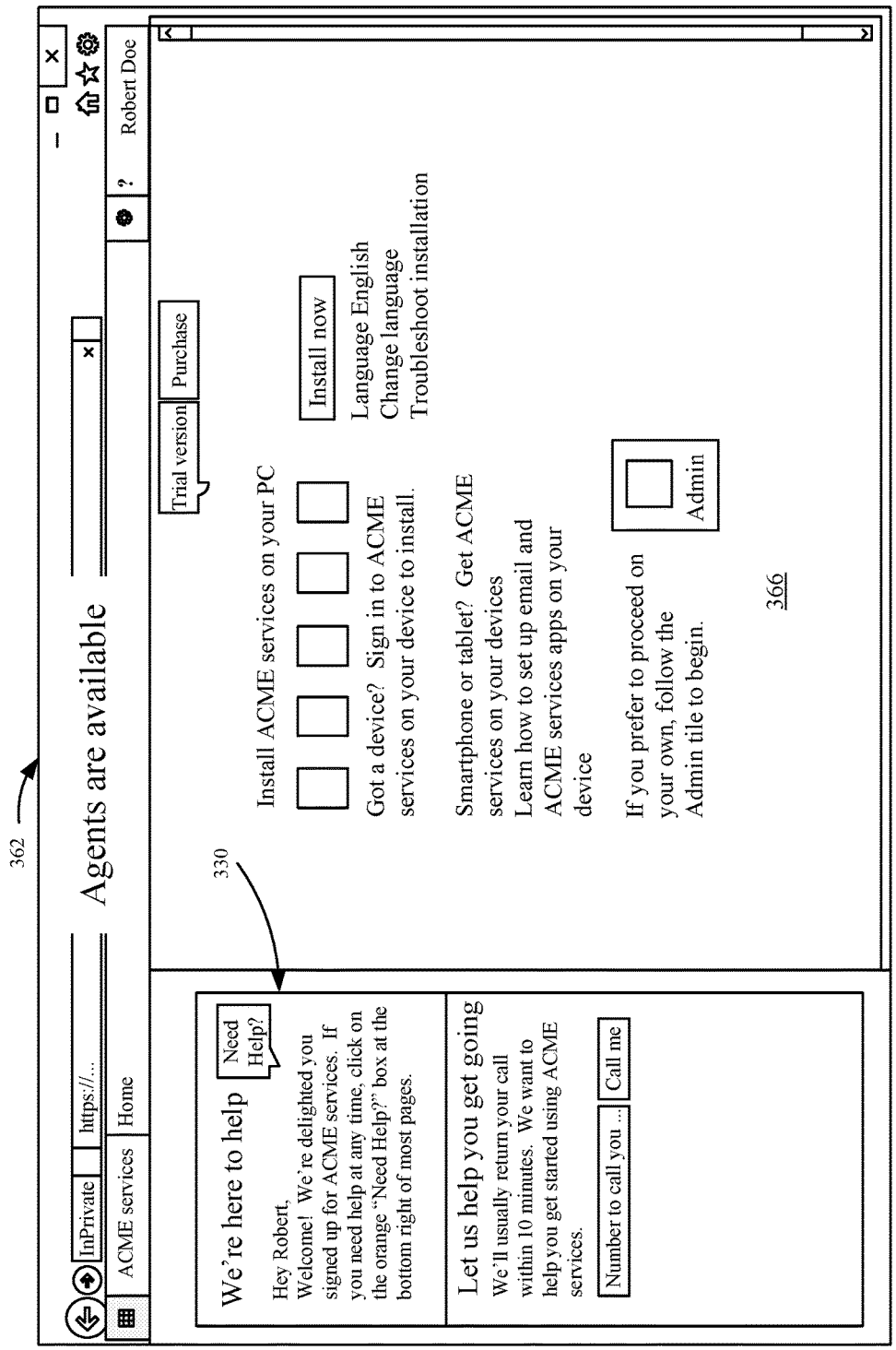
FIGS. 7A-7B show examples of user interface displays.
Figure 7B:
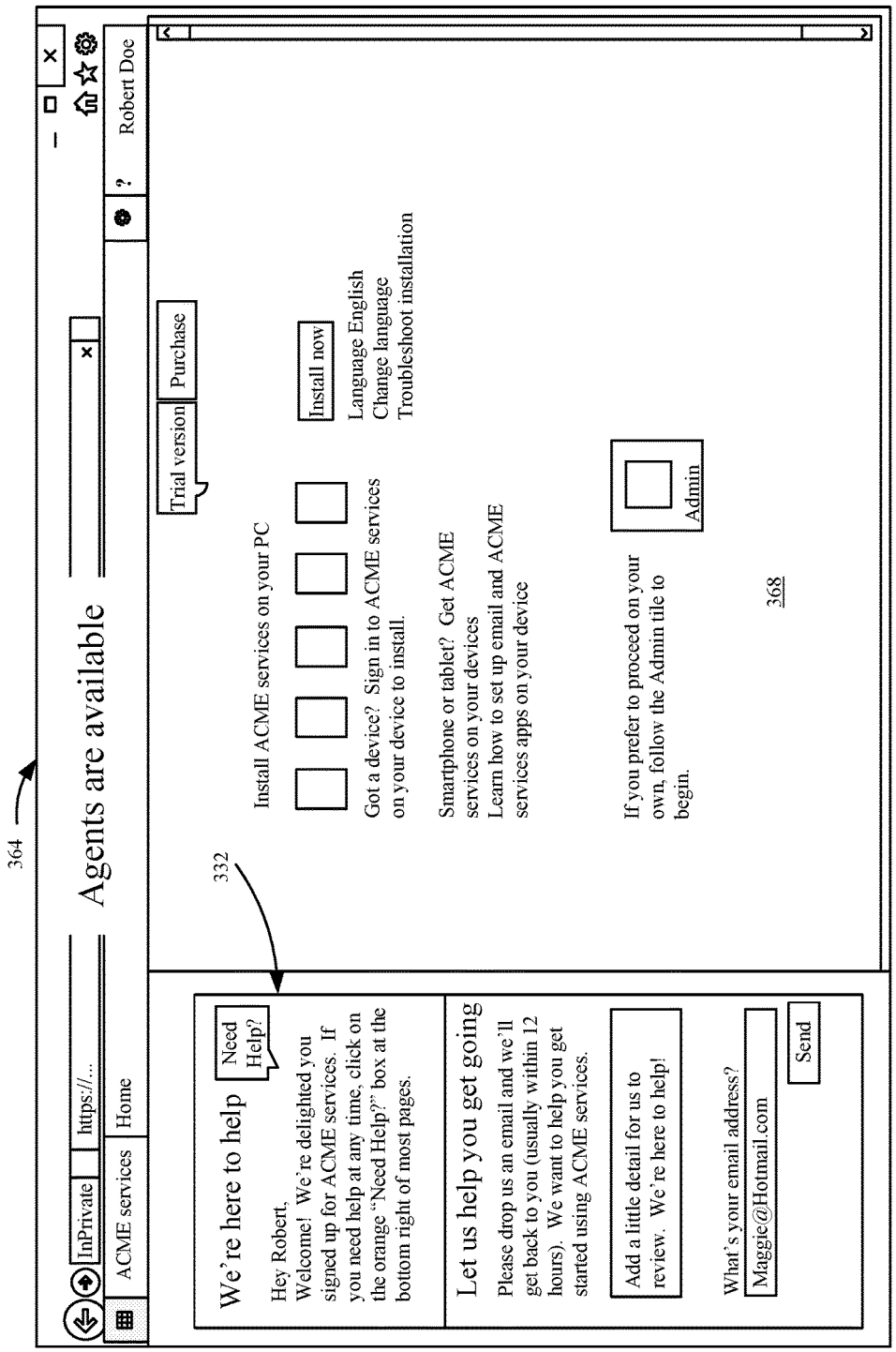

FIGS. 7A and 7B show user interface displays 362 and 364, respectively. They are illustratively user interface displays that can be generated when an issue is automatically detected or when system 112 is otherwise triggered. It can be seen that FIG. 7A includes a first user interface display portion 366 that can be displayed when the user beings running a service. Also, user interface display 330 (described above with respect to FIG. 5A) is shown adjacent display portion 364.

FIG. 7B is similar to that in FIG. 7A, and similar items are similarly numbered. Therefore, display 364 includes display portion 368 that can be generated when the user begins running a service. Also, if a support agent is unavailable, user interface display 332 (described above with respect to FIG. 5B) can be displayed instead of user interface display 330, (as shown in FIG. 7A).

Figure 8A:
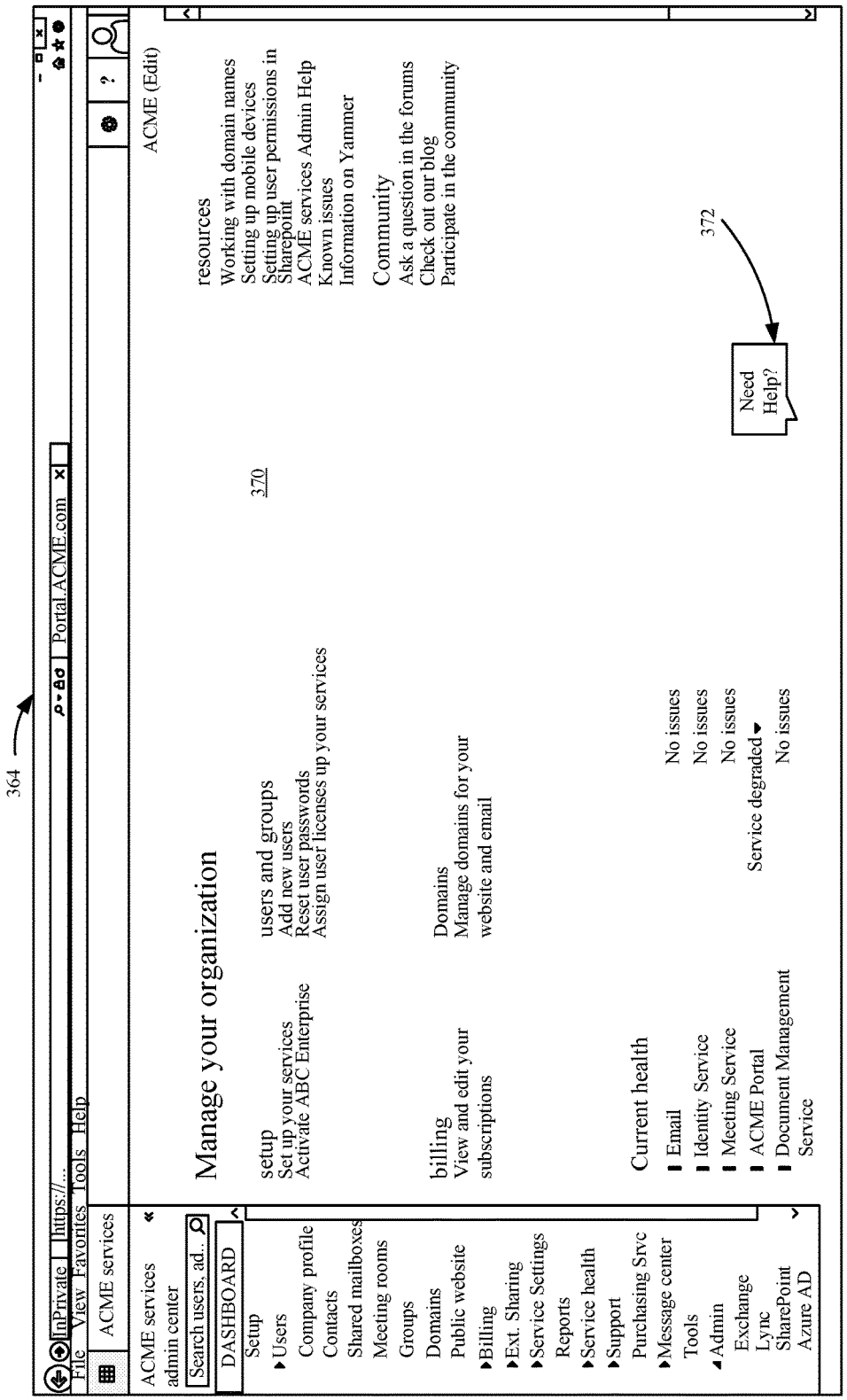
FIGS. 8A-8B show examples of user interface displays.
Figure 8B:
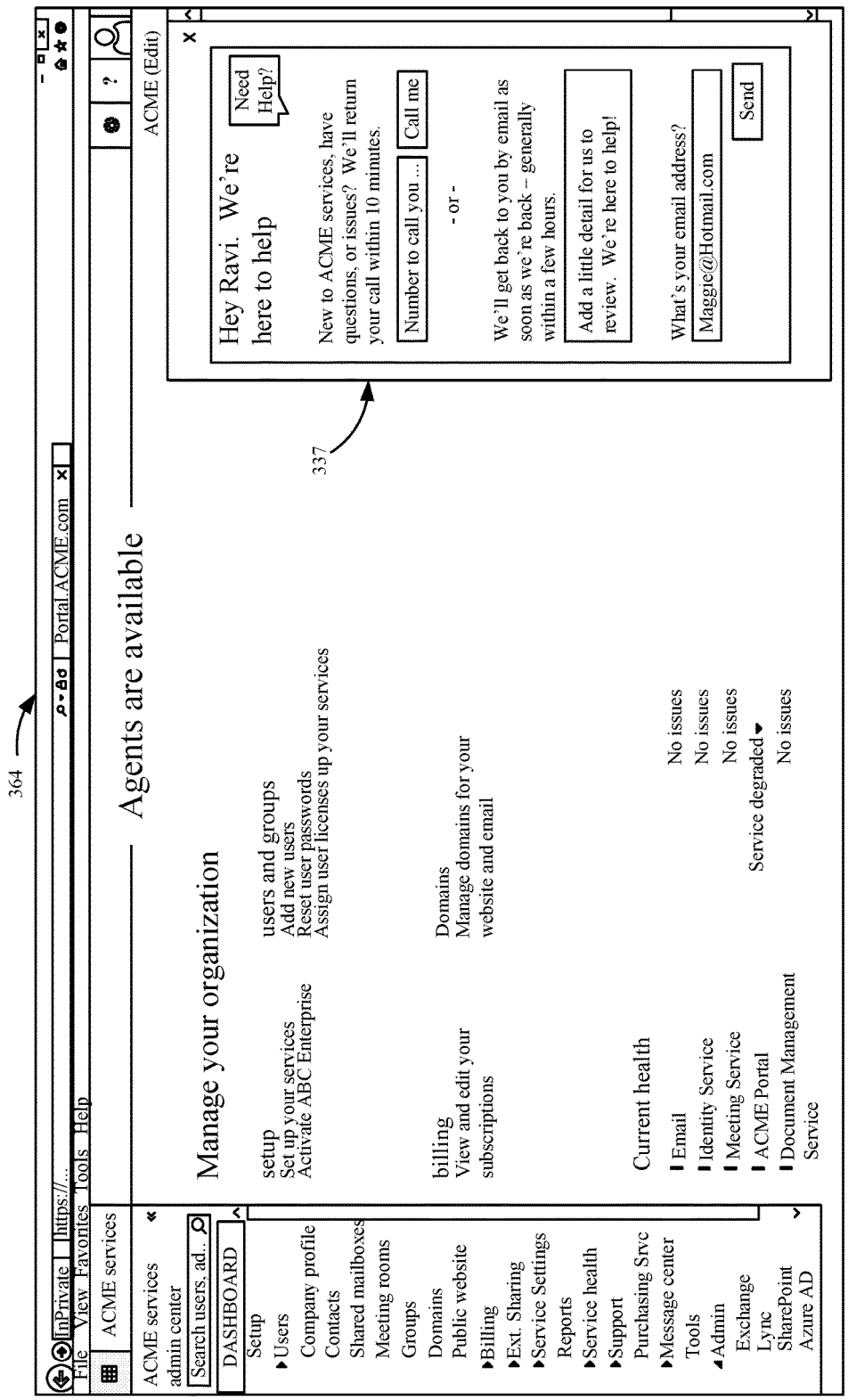

FIGS. 8A and 8B show how displays can be generated, when the user actuates a help user input mechanism to affirmatively request help. For instance, FIG. 8A shows a user interface display 370 that can be generated for an administrative user who is attempting to organize a tenant service. A help user input mechanism 372 is generated, and may be displayed on every page, slightly above the lower bound of the page, or elsewhere. When the user actuates user input mechanism 372, a help display can be generated, such as display 337, which was described in greater detail above with respect to FIG. 6A, or any other suitable display.

It can also be seen that a variety of different kinds of content information can automatically be obtained, and an engagement state of a user or tenant can be identified. This enhances the operation of the system as very little bandwidth is needed to communicate with a tenant to identify any problems or the engagement state of the tenant. This improves the speed and accuracy of the system and reduces network traffic and UI rendering overhead and processing.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
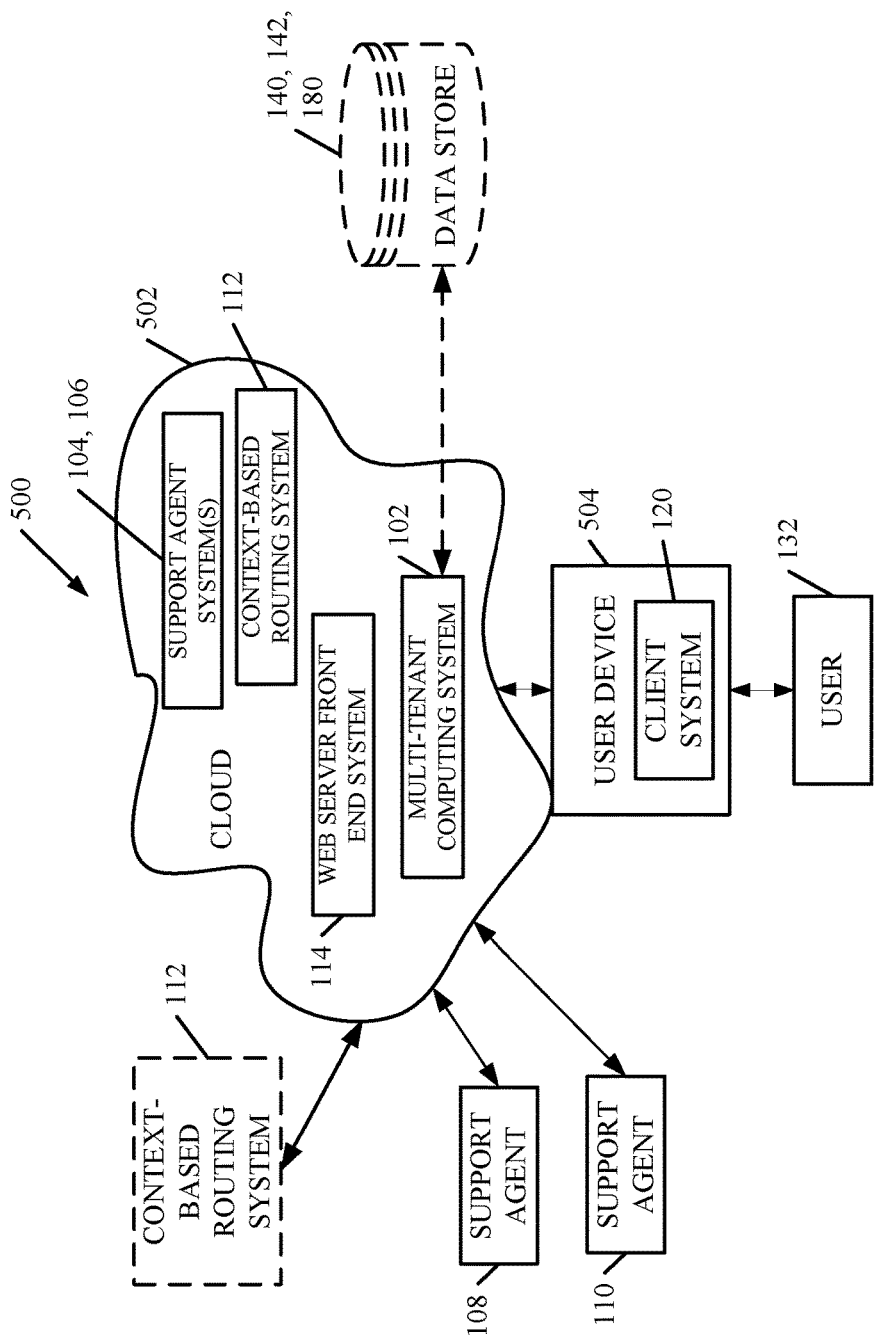
FIG. 9 shows one example of the architecture disposed in FIG. 1, deployed in a cloud computing architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that systems 102, 104, 112 and 114 can be located in cloud 502 (which can be public, private, or a combination where portions are public while others are private). Therefore, users 130-136 cam use user device (with client systems) 504 to access those systems through cloud 502.

FIG. 9 also depicts another example of a cloud architecture. FIG. 9 shows that it is also contemplated that some elements of architecture 100 can be disposed in cloud 502 while others are not. By way of example, data stores 140, 142, 180 can be disposed outside of cloud 502, and accessed through cloud 502. In another example, context-based routing system 112 is also outside of cloud 502. Regardless of where they are located, they can be accessed directly by devices 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
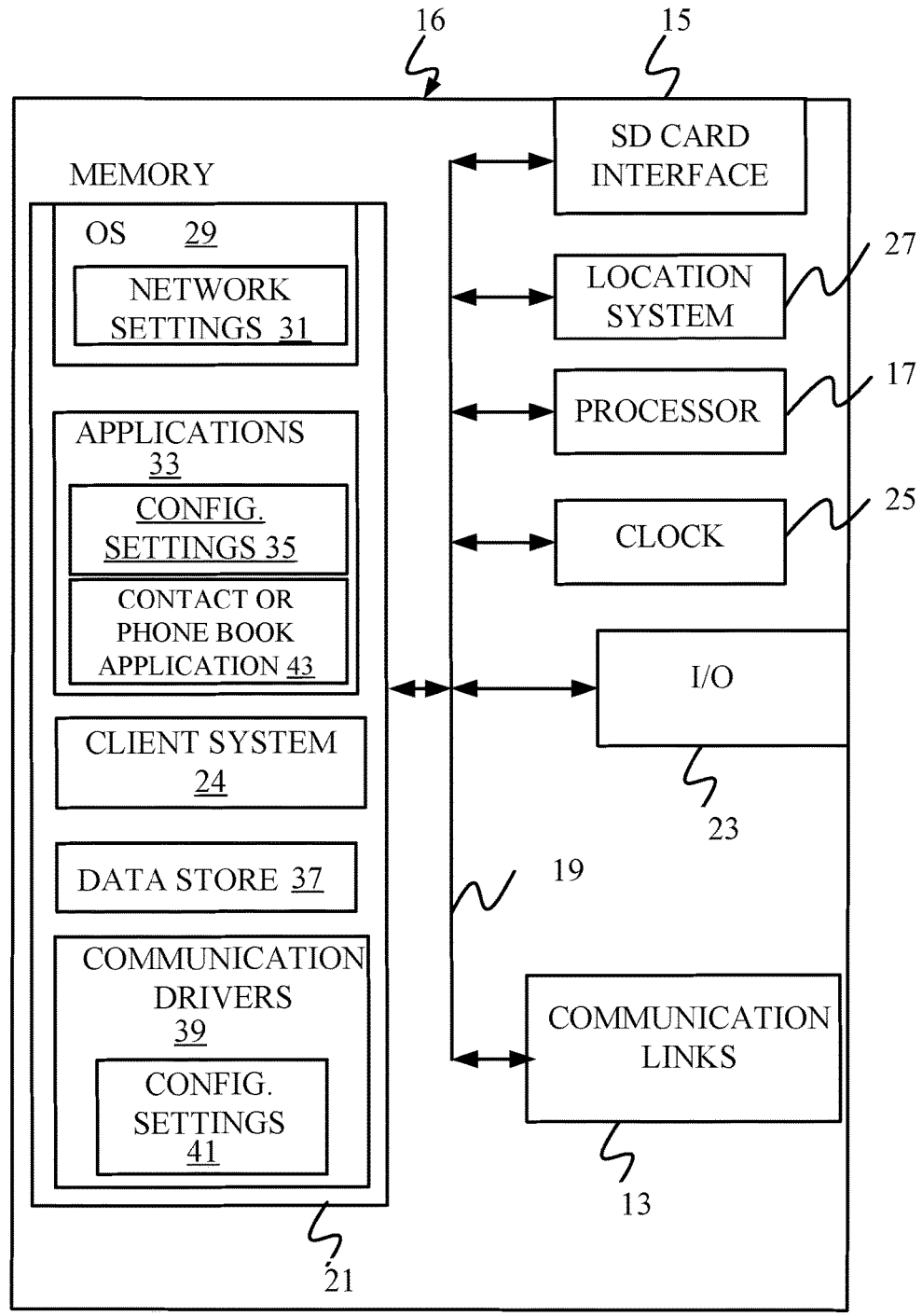
FIGS. 10-12 show examples of mobile devices that can be used in the architectures of the previous figures.
Figure 11:
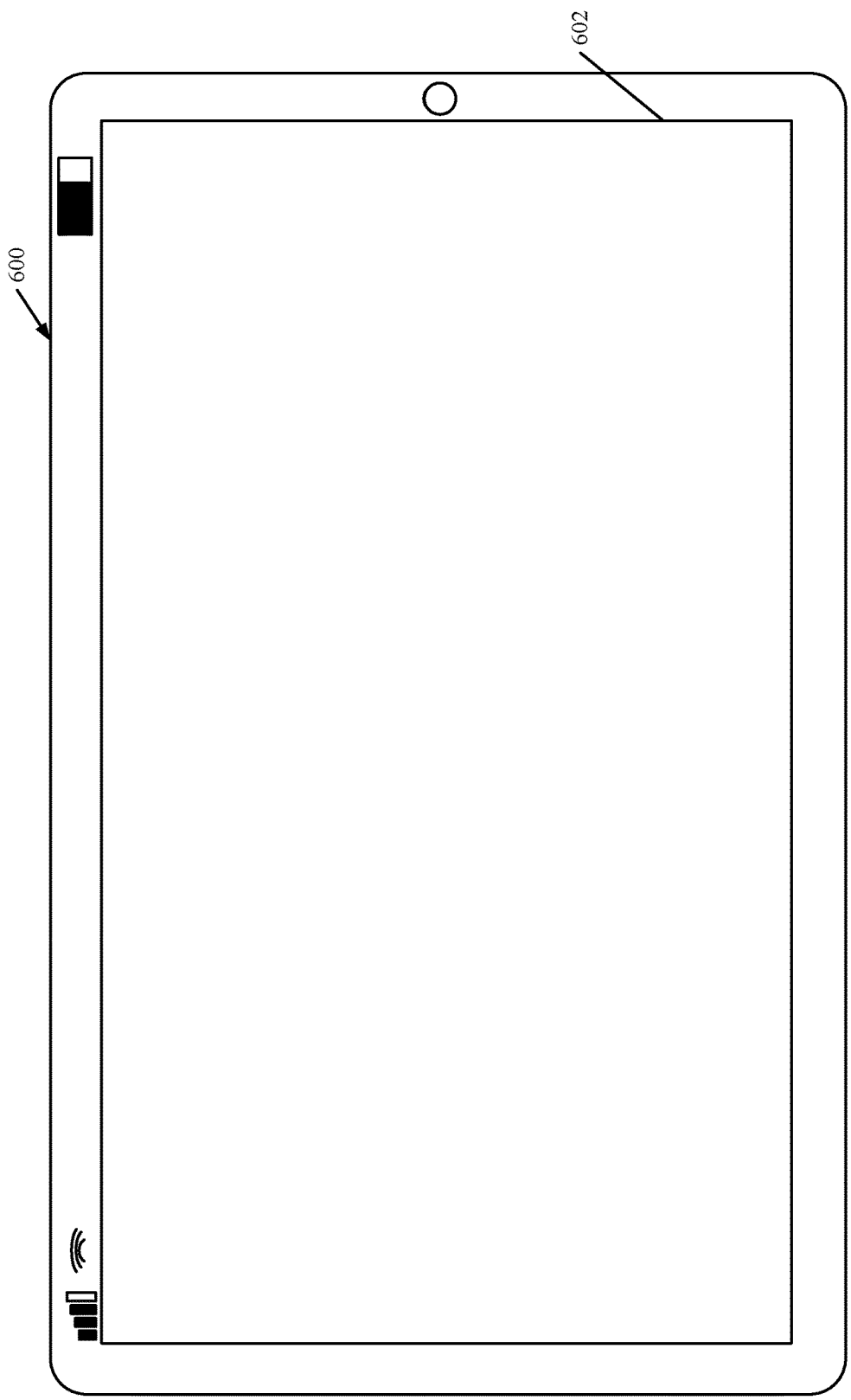
Figure 12:
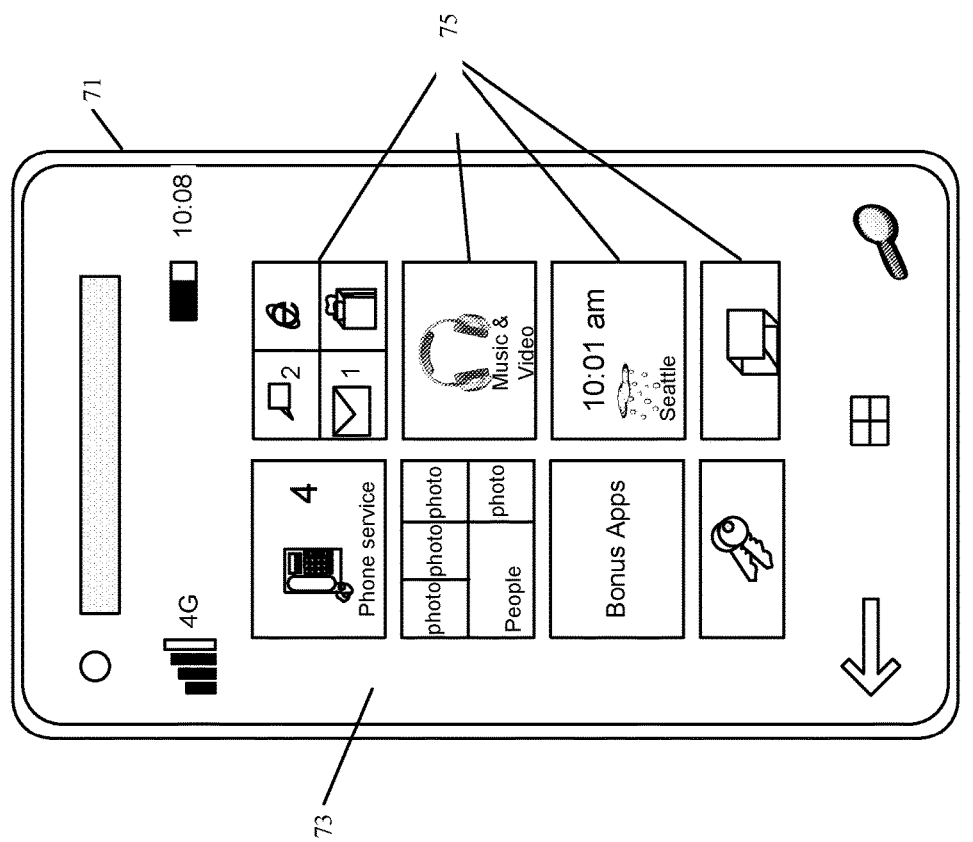
Figure 13:
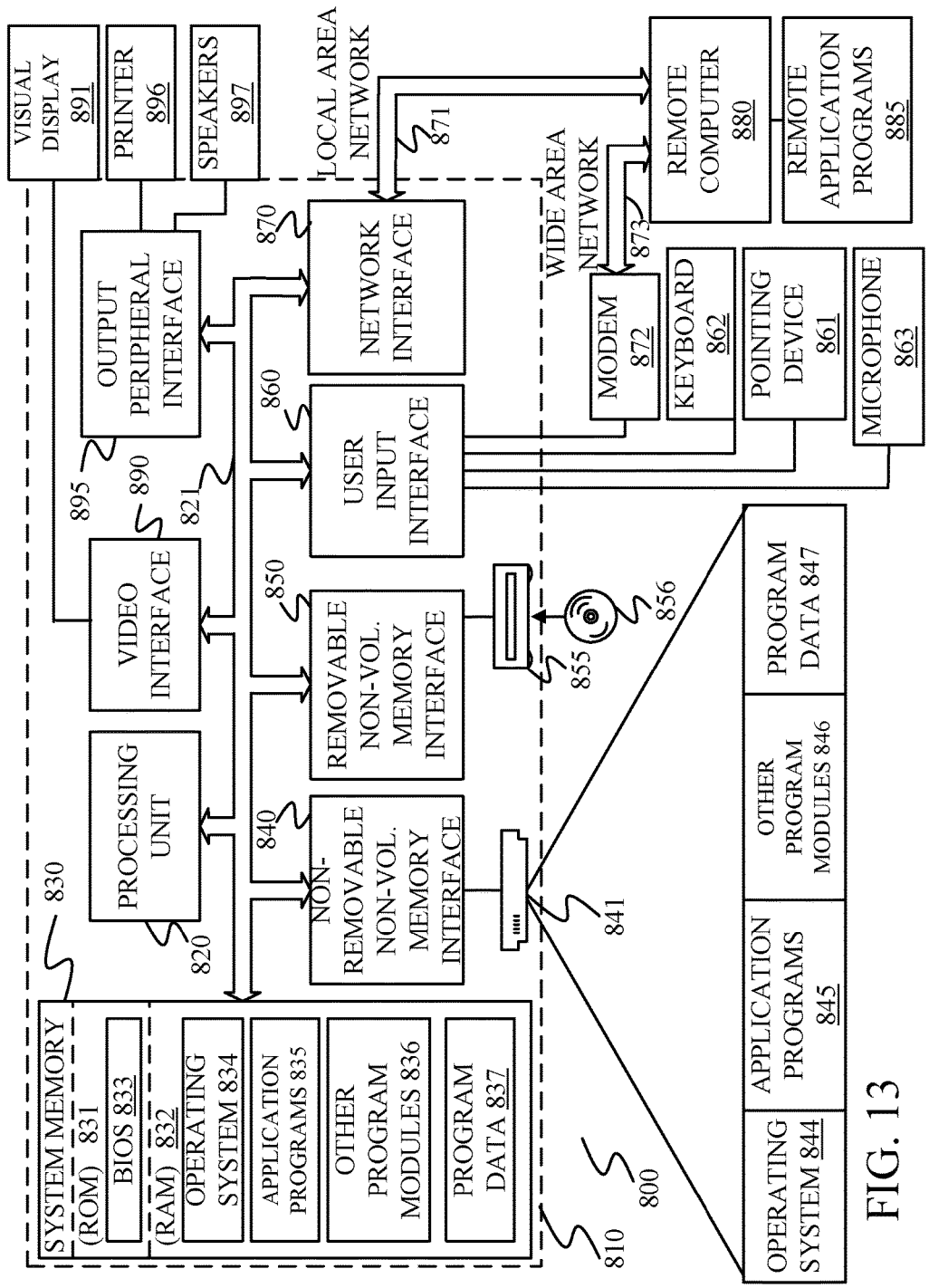
FIG. 13 is a block diagram of one example of a computing environment that can be used in the architectures of the previous figures.

FIG. 10 is a simplified block diagram of one illustrative example of a handheld or mobile computing device that can be used as a user's or client's hand held device 16, in which the present system (or parts of it) can be deployed. FIGS. 11-13 are examples of handheld or mobile devices.

FIG. 10 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors or servers or virtual machines from the previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 13 is one example of a computing environment in which architecture 100, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processor or servers or virtual machines from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
an engagement context information gathering system that obtains context information indicative of an engagement state of a tenant with a service hosted by a multi-tenant system;
an engagement state identification system that identifies the engagement state of the tenant with the service based on the context information;
a problem identification system that identifies an issue being encountered by the tenant based on the context information and the engagement state of the tenant; and
a routing system that identifies the tenant and the identified issue to a support agent system based on the identified issue.

Example 2 is the computing system of any or all previous examples wherein the engagement state identification system comprises:
a server side engagement state identification system that detects server side engagement information indicative of the engagement state of the tenant with the service.

Example 3 is the computing system of any or all previous examples wherein the server side engagement state identification system comprises:
on-line behavior detection logic that detects on-line interactions of an individual user of the tenant with the service to identify a state of engagement of the individual user with the service.

Example 4 is the computing system of any or all previous examples wherein the on-line behavior detection logic comprises:
a stage identifier that identifies a particular stage, of a multi-stage engagement process, that the individual user has completed, based on user interaction with a multi-stage wizard.

Example 5 is the computing system of any or all previous examples wherein the on-line behavior detection logic comprises:
an attempt identifier that identifies attempts by the individual user to perform a task corresponding to a stage in the multi-stage engagement process.

Example 6 is the computing system of any or all previous examples wherein the server side engagement state identification system comprises:
rate-of-change detection logic that detects a rate of change, in the identified stage of the multi-stage engagement process, that the user has completed.

Example 7 is the computing system of any or all previous examples wherein the engagement state identification system comprises:
a client side engagement state identification system that receives, from a client system, client side engagement information indicative of client side interactions of the individual user with the service.

Example 8 is the computing system of any or all previous examples wherein the client side engagement state identification system comprises:
engagement action detector logic that detects an engagement action at the client system.

Example 9 is the computing system of any or all previous examples wherein the client side engagement state identification system comprises:
idle time detection logic that detects a time that a client system is idle on a task in the multi-stage engagement process.

Example 10 is the computing system of any or all previous examples wherein the engagement state identification system comprises:
an overall tenancy engagement state identification system that identifies an overall engagement state of the tenant based on the server side engagement information and the client side engagement information.

Example 11 is the computing system of any or all previous examples wherein the overall tenancy engagement state identification system comprises:
positive engagement detection logic that detects one or more positive engagements of one or more client systems with the service; and
overall engagement state identifier logic that identifies the overall engagement state of the tenant with the service based on the one or more positive engagements detected.

Example 12 is a computer implemented method, comprising:
obtaining context information indicative of an engagement state of a tenant with a service hosted by a multi-tenant system;
determining the engagement state of the tenant with the service based on the context information;
identifying an issue being encountered by the tenant based on the context information and the engagement state of the tenant; and
routing a tenant request regarding the issue, along with an issue indicator indicative of the issue, to a support agent system based on the identified issue.

Example 13 is the computer implemented method of any or all previous examples wherein obtaining context information comprises:
obtaining server side engagement information indicative of the engagement state of the tenant with the service.

Example 14 is the computer implemented method of any or all previous examples wherein obtaining server side engagement information comprises:
detecting on-line interactions of an individual user of the tenant with the service to identify a state of engagement of the individual user with the service.

Example 15 is the computer implemented method of any or all previous examples wherein obtaining server side engagement information comprises:
detecting a rate of change, in an identified stage of a multi-stage engagement process, that the user has completed.

Example 16 is the computer implemented method of any or all previous examples wherein obtaining context information comprises:

receiving, from a client system, client side engagement information indicative of client side interactions of the individual user with the service.

Example 17 is the computer implemented method of any or all previous examples wherein determining the engagement state of the tenant comprises:

determining an overall tenancy engagement state of the tenant based on the server side engagement information and the client side engagement information.

Example 18 is the computer implemented method of any or all previous examples wherein determining the overall tenancy engagement state comprises:

detecting one or more positive engagements of one or more client systems with the service; and identifying the overall tenancy engagement state of the tenant with the service based on the one or more positive engagements detected.

Example 19 is a computing system, comprising:

an engagement context information gathering system that obtains context information indicative of an engagement state of a tenant with a service hosted by a multi-tenant system;

an individual user engagement state identification system that identifies an engagement state of each of a plurality of individual users, of the tenant, with the service, based on the context information;

an overall tenancy engagement state identification system that identifies an overall tenancy engagement state of the tenant with the service based on the context information and based on the engagement state of each of the plurality of individual users;

a problem identification system that identifies an issue being encountered by the tenant based on the context information and the overall tenancy engagement state of the tenant; and a routing system that identifies the tenant and the identified issue to a support agent system based on the identified issue.

Example 20 is the computing system of any or all previous examples wherein the individual user engagement state identification system comprises:

a server side engagement state identification system that detects server side engagement information indicative of the engagement state of the tenant with the service; and a client side engagement state identification system that receives, from a client system, client side engagement information indicative of client side interactions of the individual user with the service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
an engagement context information gathering system configured to:
detect user interaction, by an individual user associated with a client system, with a multi-stage wizard for a multi-stage engagement process associated with a service hosted by a service hosting system; and
generate a stage identifier that identifies a particular stage, of the multi-stage engagement process, that the individual user has completed;
a server side engagement state identification system configured to:
detect a rate of change, in the identified stage of the multi-stage engagement process, that the user has completed;
identify an engagement state of the client system with the service based on the stage identifier and the rate of change;
a problem identification system configured to identify an issue being encountered by the client system based on the engagement state of the client system; and
a routing system configured to identify the client system and the identified issue to a support agent system.

2. The computing system of claim 1 wherein the server side engagement state identification system comprises:
on-line behavior detection logic that detects on-line interactions of the individual user of the client system with the service to identify a state of engagement of the individual user with the service.

3. The computing system of claim 1 wherein the on-line behavior detection logic comprises:
an attempt identifier that identifies attempts by the individual user to perform a task corresponding to a stage in the multi-stage engagement process.

4. The computing system of claim 1 wherein the engagement state identification system comprises:
a client side engagement state identification system that receives, from the client system, client side engagement information indicative of client side interactions of the individual user with the service.

5. The computing system of claim 4 wherein the client side engagement state identification system comprises:
engagement action detector logic that detects an engagement action at the client system.

6. The computing system of claim 5 wherein the client side engagement state identification system comprises:
idle time detection logic that detects a time that the client system is idle on a task in the multi-stage engagement process.

7. The computing system of claim 6 wherein the engagement state identification system comprises:
an overall tenancy engagement state identification system that identifies an overall engagement state of the client system based on the server side engagement information and the client side engagement information.

8. The computing system of claim 7 wherein the overall tenancy engagement state identification system comprises:
positive engagement detection logic that detects one or more positive engagements of one or more client systems with the service; and
overall engagement state identifier logic that identifies the overall engagement state of the client system with the service based on the one or more positive engagements detected.

9. A computer implemented method, comprising:
detecting user interaction, by a user associated with a client system, with a multi-stage engagement process associated with a service hosted by a service hosting system;
detecting a rate of change, in an identified stage of the multi-stage engagement process that the user has completed;
generating context information indicative of the rate of change;
determining the engagement state of the client system with the service based on the context information;

identifying an issue being encountered by the client system based on the context information and the engagement state of the client system; and routing a client system request regarding the issue, along with an issue indicator indicative of the issue, to a support agent system based on the identified issue.

10. The computer implemented method of claim 9 wherein obtaining context information comprises:

obtaining server side engagement information indicative of the engagement state of the client system with the service.

11. The computer implemented method of claim 10 wherein obtaining server side engagement information comprises:

detecting on-line interactions of the user of the client system with the service to identify a state of engagement of the individual user with the service.

12. The computer implemented method of claim 11 wherein obtaining context information comprises:

receiving, from the client system, client side engagement information indicative of client side interactions of the user with the service.

13. The computer implemented method of claim 12 wherein determining the engagement state of the client system comprises:

determining an overall tenancy engagement state of the client system based on the server side engagement information and the client side engagement information.

14. The computer implemented method of claim 13 wherein determining the overall tenancy engagement state comprises:

detecting one or more positive engagements of one or more client systems with the service; and identifying the overall tenancy engagement state of the client system with the service based on the one or more positive engagements detected.

15. A computing system, comprising:

an engagement context information gathering system that obtains context information indicative of an engagement state of a tenant with a service hosted by a multi-tenant system;

an individual user engagement state identification system that identifies an engagement state of each individual user of a plurality of individual users, of the tenant, with the service, based on the context information, wherein the individual user engagement state identification system comprises:

a server side engagement state identification system that detects server side engagement information indicative of the engagement state; and a client side engagement state identification system that receives, from a client system, client side engagement information indicative of client side interactions of the individual user with the service;

an overall tenancy engagement state identification system that identifies an overall tenancy engagement state of the tenant with the service based on the context information and based on the engagement state of each of the plurality of individual users;

a problem identification system that identifies an issue being encountered by the tenant based on the context information and the overall tenancy engagement state of the tenant; and a routing system that identifies the tenant and the identified issue to a support agent system based on the identified issue.

* * * * *